(12) United States Patent
Yahata et al.

(10) Patent No.: US 7,146,804 B2
(45) Date of Patent: Dec. 12, 2006

(54) EXHAUST GAS CLEANING SYSTEM HAVING PARTICULATE FILTER

(75) Inventors: Shigeto Yahata, Kariya (JP); Makoto Saito, Okazaki (JP); Tsukasa Kuboshima, Okazaki (JP); Shinichiro Okugawa, Toyota (JP)

(73) Assignee: Denso Corporation, Kariya (JP)

(*) Notice: Subject to any disclaimer, the term of this patent is extended or adjusted under 35 U.S.C. 154(b) by 180 days.

(21) Appl. No.: 10/460,208

(22) Filed: Jun. 13, 2003

(65) Prior Publication Data
US 2003/0230078 A1 Dec. 18, 2003

(30) Foreign Application Priority Data
Jun. 13, 2002 (JP) .............................. 2002-173017

(51) Int. Cl.
*F01N 3/00* (2006.01)
(52) U.S. Cl. .............................. 60/295; 60/297; 60/311
(58) Field of Classification Search .................. 60/285, 60/295, 297, 311
See application file for complete search history.

(56) References Cited

U.S. PATENT DOCUMENTS

| | | | |
|---|---|---|---|
| 4,603,550 A | | 8/1986 | Shinzawa |
| 4,630,438 A | * | 12/1986 | Shinzawa ..................... 60/274 |
| 4,665,690 A | * | 5/1987 | Nomoto et al. ............... 60/286 |
| 4,756,155 A | * | 7/1988 | Shinzawa ..................... 60/285 |
| 5,319,930 A | * | 6/1994 | Shinzawa et al. ............. 60/286 |
| 6,237,326 B1 | * | 5/2001 | Russell ........................ 60/274 |
| 6,644,023 B1 | * | 11/2003 | Hirota et al. ................. 60/297 |

* cited by examiner

*Primary Examiner*—Thomas Denion
*Assistant Examiner*—Diem Tran
(74) *Attorney, Agent, or Firm*—Nixon & Vanderhye, P.C.

(57) ABSTRACT

An exhaust gas cleaning system for a diesel engine has a diesel particulate filter (DPF) disposed in an exhaust pipe. An electronic control unit of the system controls regeneration of the DPF. The DPF is heated and regenerated only when an operating state of the engine is in an area where temperature-increasing efficiency is high, in the case where a quantity of particulate matters collected by the DPF is equal to or greater than a first threshold and is less than a second threshold. The second threshold is greater than the first threshold. If the quantity of the collected particulate matters becomes equal to or greater than the second threshold, the regeneration is performed even if the operating state is not in the area of the high temperature-increasing efficiency.

18 Claims, 6 Drawing Sheets

EXHAUST GAS CLEANING SYSTEM HAVING PARTICULATE FILTER

CROSS REFERENCE TO RELATED APPLICATION

This application is based on and incorporates herein by reference Japanese Patent Application No. 2002-173017 filed on Jun. 13, 2002.

BACKGROUND OF THE INVENTION

1. Field of the Invention

The present invention relates to an exhaust gas cleaning system having a particulate filter for collecting particulate matters included in exhaust gas of an internal combustion engine. Specifically, the present invention relates to an exhaust gas cleaning system capable of inhibiting deterioration of fuel consumption due to regeneration of a particulate filter.

2. Description of Related Art

Lately, reduction of particulate matters discharged from a diesel engine has been a major issue as an environmental measure. Therefore, an exhaust gas cleaning system having a diesel particulate filter (DPF) for collecting the particulate matters is disposed in an exhaust pipe. The DPF is generally made of porous ceramics having a multiplicity of exhaust gas passages. When the exhaust gas passes through porous filter walls providing the exhaust gas passages, the particulate matters are adsorbed and collected.

If the collected particulate matters keep on depositing in the DPF, a pressure loss may increase and engine efficiency may decrease. Therefore, the exhaust gas cleaning system has regenerating means for regenerating the DPF at suitable timing by combusting the collected particulate matters. As a method of the regeneration, an intake air quantity is decreased than usual, or a post-injection is performed after a main injection, for instance. Thus, the temperature of the exhaust gas introduced into the DPF is increased in order to combust and to eliminate the particulate matters in the DPF.

However, if the DPF is regenerated frequently by the above regenerating methods, fuel consumption is increased because energy is consumed to increase the temperature of the exhaust gas. Therefore, as an attempt to reduce the increase in the fuel consumption, a plurality of regenerating means having various energy efficiency and temperature-increasing performance is disposed, and an appropriate regenerating means is selected from them in accordance with an operating state of the engine. For instance, in an exhaust gas cleaning system proposed in Japanese Patent Unexamined Publication No. 2000-213332, a range of the operating state of the engine is divided into a plurality of ranges, and an optimum regenerating means is selected for each range. In the system, the most frequently used range of the operating state is determined based on a record of the operating state. Another range of the operating state is selected as a selection range so that regenerating means selected in the selection range has a lower fuel consumption ratio than that of the regenerating means of the most frequently used range. If the quantity of the particulate matters collected by the DPF exceeds a predetermined value and the operating state enters the above selection range, the regeneration is performed.

In the above system, a multiplicity of the regenerating means has to be provided, and the regenerating means has to be switched in accordance with the range of the operating state. Moreover, the most frequently used range varies by a vehicle driver. Therefore, the record of the operating state has to be detected for each vehicle driver, and the selection range has to be set for each vehicle driver. As a result, control of the regeneration is complicated.

SUMMARY OF THE INVENTION

It is therefore an object of the present invention to provide an exhaust gas cleaning system having a diesel particulate filter (DPF), which is capable of efficiently regenerating the DPF while inhibiting increase in fuel consumption with relatively simple control.

According to an aspect of the present invention, an exhaust gas cleaning system for an internal combustion engine has a particulate filter, operating state detecting means, regenerating means and regeneration controlling means. The particulate filter is disposed in an exhaust pipe of the engine for collecting particulate matters included in exhaust gas. The operating state detecting means detects operating state of the engine. The regenerating means regenerates the particulate filter. The regeneration controlling means controls the regeneration of the particulate filter with the regenerating means.

The regeneration controlling means includes collecting state determining means, regeneration suitability determining means and regeneration performing means. The collecting state determining means determines whether a collecting state parameter, which increases as a quantity of the collected particulate matters increases, is greater than a first threshold or a second threshold. The second threshold is greater than the first threshold. The regeneration suitability determining means determines whether the operating state of the engine detected by the operating state detecting means is in a suitable area that provides a high regenerating efficiency of the particulate filter. The regeneration performing means performs the regeneration of the particulate filter with the regenerating means based on the result of the determination performed by the regeneration suitability determining means. The regeneration performing means operates the regenerating means only when the regeneration suitability determining means determines that the operating state of the engine is in the suitable area, in the case where the collecting state parameter is equal to or greater than the first threshold and is less than the second threshold. The regeneration performing means operates the regenerating means when the collecting state parameter is equal to or greater than the second threshold, regardless of the result of the determination performed by the regeneration suitability determining means.

Thus, the regenerating efficiency is improved, since the regeneration performing means operates the regenerating means only when the operating state of the engine is determined to be in the suitable area, in the case where the collecting state parameter is equal to or greater than the first threshold and is less than the second threshold. Moreover, the safety is improved since the regeneration performing means operates the regenerating means when the collecting state parameter is equal to or greater than the second threshold, regardless of the result of the determination performed by the regeneration suitability determining means. Thus, the regeneration is performed safely and efficiently and the deterioration of the fuel consumption is inhibited with the relatively simple control, improving the practicability.

As the collecting state parameter, a quantity of the collected particulate matters, an integrated travel distance, an integrated fuel injection quantity and the like can be employed.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

First Embodiment

Figure 1:
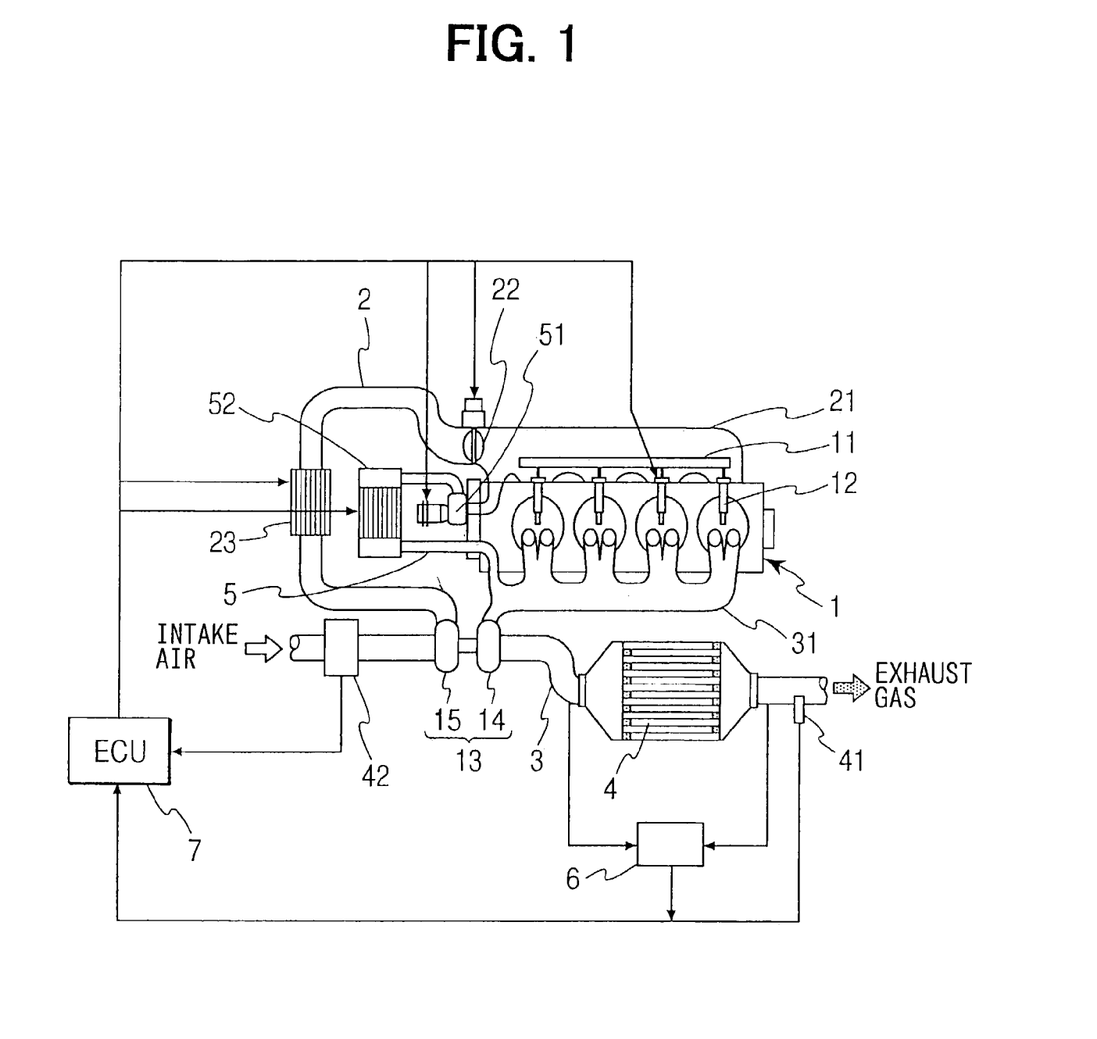
FIG. 1 is a schematic diagram showing an exhaust gas cleaning system for an internal combustion engine according to a first embodiment of the present invention.

Referring to FIG. 1, a diesel engine 1 having an exhaust gas cleaning system of the first embodiment is illustrated. The diesel engine 1 has a common rail 11, which is common to respective cylinders, and a plurality of fuel injection valves 12, which are connected to the common rail 11 and inject fuel into combustion chambers of the respective cylinders. An intake manifold 21 of the engine 1 is connected with an intake pipe 2. An intake throttle 22 is disposed in the connection between the intake manifold 21 and the intake pipe 2 for regulating a flow rate of intake air.

An exhaust manifold 31 of the engine 1 is connected with an exhaust pipe 3. A diesel particulate filter (DPF) 4 is disposed in the exhaust pipe 3. The DPF 4 has a publicly known structure. The DPF 4 is made of heat-resistant ceramics such as cordierite and is formed in the shape of a honeycomb. The honeycomb has a matrix of porous filter walls forming a multiplicity of cells extending from one end to another end of the honeycomb. An inlet side end or an outlet side end of each cell is blocked alternately. The exhaust gas discharged from the engine 1 enters the cells whose inlet side ends are open. When the exhaust gas passes through the porous filter wall, particulate matters are trapped.

A turbine 14 of a centrifugal supercharger 13 is disposed upstream of the DPF 4 in the exhaust pipe 3. A compressor 15 is disposed in the intake pipe 2. The turbine 14 is connected with the compressor 15 through a turbine shaft. The turbine 14 is driven with the use of thermal energy of the exhaust gas. Meanwhile, the compressor 15 is driven by the turbine 14 through the turbine shaft and compresses the intake air, which is introduced into the intake pipe 2. A cooler 23 is disposed upstream of the intake throttle 22 in the intake pipe 2. The intake air, which is compressed and heated at the compressor 15, is cooled at the cooler 23.

The exhaust manifold 31 is connected with the intake manifold 21 through an exhaust gas recirculation passage (EGR passage) 5. Thus, part of the exhaust gas is recirculated to the intake air through the EGR passage 5. An EGR valve 51 is disposed at an outlet of the EGR passage 5 to the intake manifold 21. The EGR valve 51 regulates the quantity of the recirculated exhaust gas (EGR quantity). An EGR cooler 52 is disposed in the EGR passage 5 for cooling the recirculated exhaust gas.

A pressure difference sensor 6 is disposed in the exhaust pipe 3. The pressure difference sensor 6 measures a difference between a pressure in an upstream portion of the DPF 4 and a pressure in a downstream portion of the DPF 4, in order to measure a quantity of the particulate matters collected by the DPF 4 (PM collection quantity). An end of the pressure difference sensor 6 is connected with the exhaust pipe 3 in the upstream portion relative to the DPF 4 through a pressure introduction pipe. The other end of the pressure difference sensor 6 is connected with the exhaust pipe 3 in the downstream portion relative to the DPF 4 through another pressure introduction pipe. The pressure difference sensor 6 outputs a signal corresponding to the pressure difference between the upstream portion and the downstream portion of the DPF 4. An exhaust gas temperature sensor 41 for measuring the temperature of the DPF 4 is disposed at the outlet of the DPF 4 in the exhaust pipe 3. An intake airflow rate sensor 42 is disposed in the intake pipe 2 in the upstream portion relative to the compressor 15 of the supercharger 13. Detection signals of the sensors are inputted to an electronic control unit (ECU) 7.

In addition, the ECU 7 receives signals from various sensors for measuring an opening degree of the intake throttle 22, an opening degree of the EGR valve 51, an engine rotation speed, vehicle velocity, an accelerator position, cooling water temperature, a crank position, fuel pressure and the like. Thus, the ECU 7 detects the operating state of the engine 1. The ECU 7 calculates an optimum fuel injection quantity and the optimum EGR quantity in accordance with the operating state. Thus, the ECU 7 feedback-controls the intake throttle 22, the fuel injection valves 12, the EGR valve 51 and the like, and meanwhile, the ECU 7 controls the regeneration of the DPF 4.

As the regenerating means of the DPF 4, a method of increasing the exhaust gas temperature by performing a post-injection or by delaying the fuel injection timing, or by driving the intake throttle 22 toward a closing direction from a usual position can be employed, for instance. When the post-injection is performed or when the fuel injection timing is delayed, part of energy is converted into thermal energy (not into motive energy) because ignition timing is delayed. Accordingly, the exhaust gas is heated to a high temperature generally between 300 and 700° C., while the normal temperature of the exhaust gas in the case where the normal injection is performed is generally between 150 and 400° C. Thus, the high-temperature exhaust gas is introduced into the DPF 4. Likewise, when the intake throttle 22 is driven toward the closing direction, the flow rate of the intake air is decreased and thermal capacity of the gas entering the combustion chamber of the engine 1 is reduced. As a result, the exhaust gas temperature is increased, and the particulate matters depositing in the DPF 4 are combusted. Thus, the ability of the DPF 4 to collect the particulate matters is regenerated. In accordance with the operating state, a certain regenerating means may be selected from a plurality of regenerating means, or a heating device such as a burner or a heater may be used as the regenerating means.

Figure 2A:
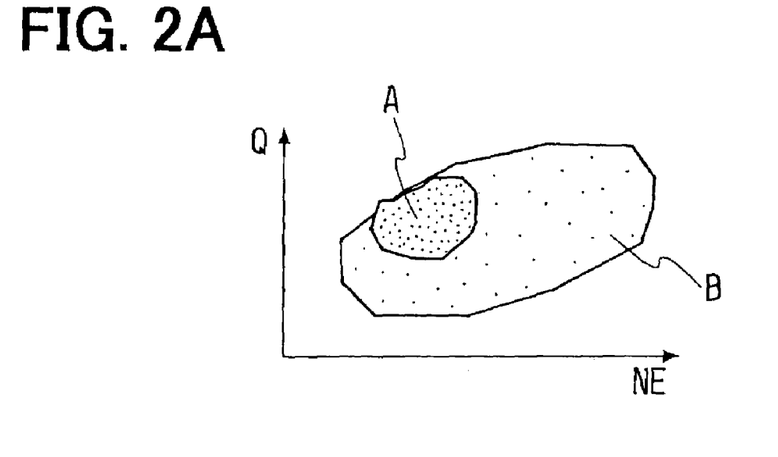
FIG. 2A is a graph showing a relation among an engine rotation speed, an injection quantity and temperature-increasing efficiency.
Figure 2B:
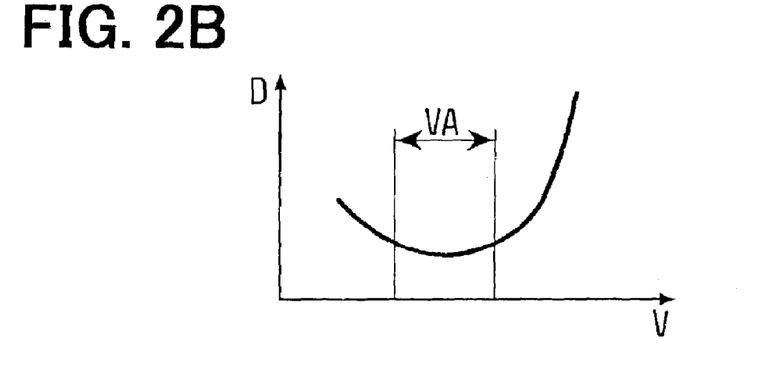
FIG. 2B is a graph showing a relation between vehicle velocity and the temperature-increasing efficiency.
Figure 2C:
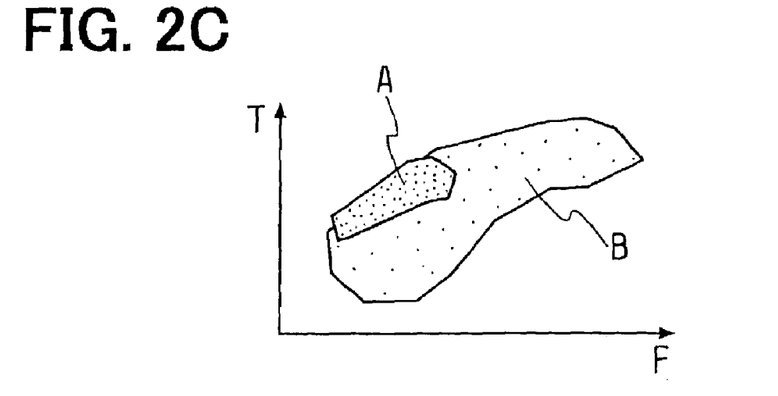
FIG. 2C is a graph showing a relation among an intake airflow rate, DPF temperature and the temperature-increasing efficiency.

The temperature-increasing efficiency of the above regenerating means also varies, depending on operating conditions of the engine 1. For instance, the engine rotation speed NE, the fuel injection quantity Q and the temperature-increasing efficiency are related with each other as shown in FIG. 2A. In FIG. 2A, an area "B" represents an area where the regeneration of the DPF 4 is possible, and an area "A" represents an area where the temperature-increasing efficiency is especially high. As shown in FIG. 2A, the DPF 4 can be regenerated very efficiently in the specific area "A" where the engine rotation speed NE is relatively low and the fuel injection quantity Q is relatively large. When the vehicle velocity V is greater or less than a specific range VA that provides the high temperature-increasing efficiency, the fuel consumption is deteriorated because of the temperature increase as shown in FIG. 2B. In FIG. 2B, the axis "D" represents a degree of the deterioration of the fuel consumption. As for the intake airflow rate F and the temperature T of the DPF 4, there is a specific operating area that provides the high temperature-increasing efficiency. When the intake airflow rate F is low, the thermal capacity is decreased and energy required for increasing the temperature is reduced. When the temperature T of the DPF 4 is high, increasing range of the temperature to the temperature at which the particulate matters can be combusted is reduced. Therefore, the temperature-increasing efficiency is especially high in an area "A" in FIG. 2C where the intake airflow rate F is small and the temperature T of the DPF 4 is high. In the embodiment, the relation between the operating conditions and the temperature-increasing efficiency is obtained in advance, and the regeneration in the specific area providing the high temperature-increasing efficiency is prioritized. Thus, the deterioration of the fuel consumption due to the regeneration of the DPF 4 is inhibited.

More specifically, the ECU 7 as regeneration controlling means calculates the PM collection quantity based on the detection values, which are outputted by the exhaust gas temperature sensor 41 and the intake airflow rate sensor 42, and the pressure difference between the upstream portion and the downstream portion of the DPF 4, which is measured by the pressure difference sensor 6. Then, the ECU 7 compares the calculated PM collection quantity with a first threshold A1 or a second threshold A2, which is greater than the first threshold A1. If the PM collection quantity becomes equal to or greater than the first threshold A1, it is determined whether the operating state of the engine 1 is in a suitable area, where the temperature-increasing efficiency is high and the DPF 4 can be regenerated efficiently with the selected regenerating means. If the operating state is determined to be in the suitable area, the regeneration is performed. If it is determined that the operating state is not in the suitable area, the determination is performed repeatedly since the PM collection quantity becomes equal to or greater than the first threshold A1 until the PM collection quantity reaches the second threshold A2. If the PM collection quantity becomes equal to or greater than the second threshold A2, the regeneration is performed regardless of the result of the determination.

Figure 3:
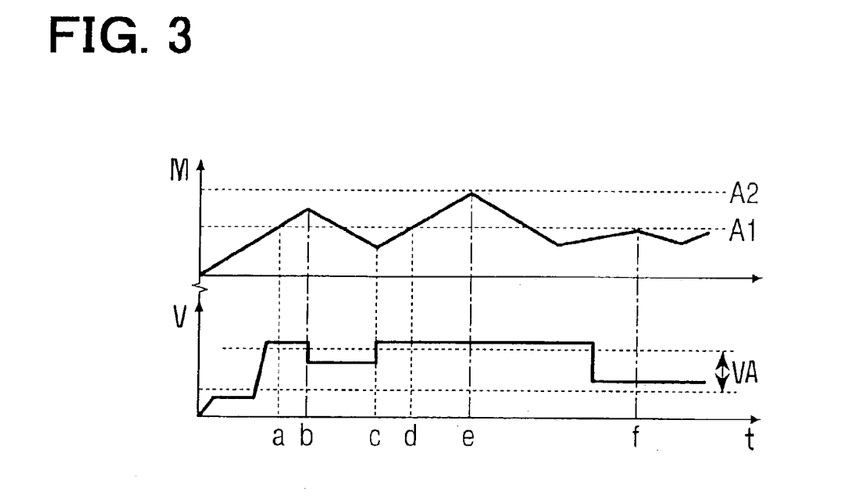
FIG. 3 is a time chart showing regeneration processing performed by an electronic control unit (ECU) of the exhaust gas cleaning system according to the first embodiment.
Figure 4:
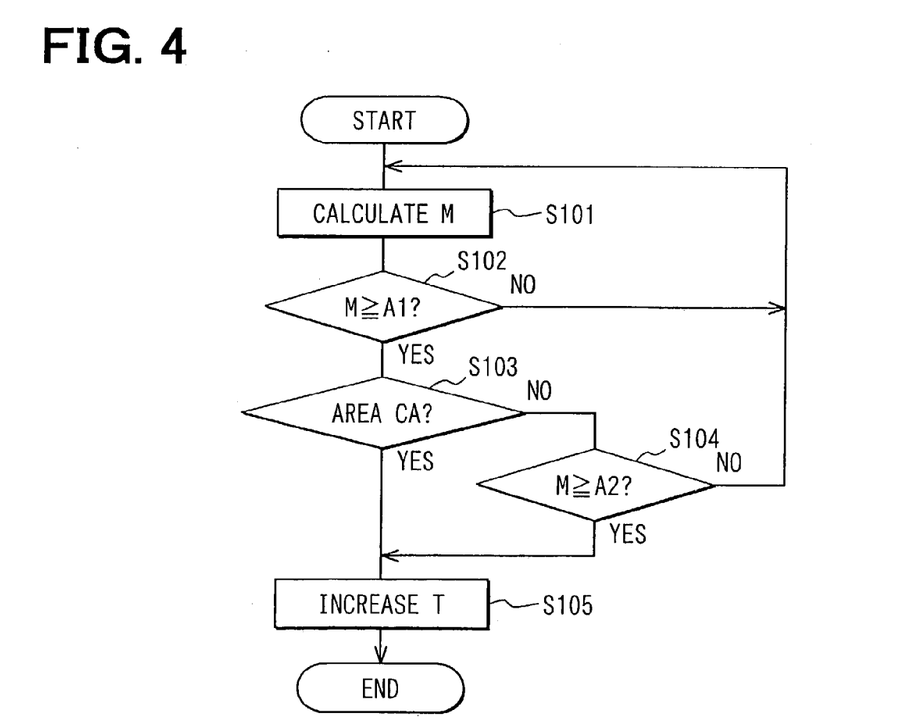
FIG. 4 is a flowchart showing the regeneration processing performed by the ECU according to the first embodiment.

Next, an example of the regeneration control performed by the ECU 7 will be explained based on a flowchart shown in FIG. 4. In the control of the first embodiment, it is determined whether the engine is in the operating condition of high temperature-increasing efficiency or not based on the vehicle velocity V, as shown by a time chart in FIG. 3. The regeneration control processing of the first embodiment is performed at a predetermined interval. First, in Step S101, the ECU 7 calculates the PM collection quantity M based on the exhaust gas flow rate (volume flow rate) and the pressure difference between the upstream portion and the downstream portion of the DPF 4. The exhaust gas flow rate is calculated from the detection values of the exhaust gas temperature sensor 41 and the intake airflow rate sensor 42. The pressure difference between the upstream portion and the downstream portion of the DPF 4 is measured by the pressure difference sensor 6. In general, at a certain exhaust gas flow rate, the pressure difference increases as the PM collection quantity M increases. Therefore, the PM collection quantity M can be calculated based on the relation. Then, in Step S102, it is determined whether the calculated PM collection quantity M is "equal to or greater than" the first threshold A1 or not. If the result of the determination in Step S102 is "NO", the processing returns to the start (during a period from a time point "0" to another time point "a" in the time chart shown in FIG. 3).

If the result of the determination in Step S102 is "YES", the processing proceeds to Step S103. In Step S103, it is determined whether the operating state of the engine 1 is in a suitable area CA, which is an area suitable for regenerating the DPF 4. In the first embodiment, it is determined that the operating state of the engine 1 is in the suitable area CA when the vehicle velocity V is in a range VA shown in FIG. 3, in which the temperature-increasing efficiency is high. For instance, at the time point "a" in FIG. 3, the PM collection quantity M has reached the first threshold A1 but the vehicle velocity V is greater than the range VA of the high temperature-increasing efficiency. Therefore, the determination in Step S103 is determined negatively and the processing proceeds to Step S104. In Step S104, it is determined whether the PM collection quantity is "equal to or greater than" the second threshold A2 or not. If the result of the determination in Step S104 is "NO", the processing returns to the start.

The steps from Step S101 to Step S103 are repeated. If the vehicle velocity V enters the range VA in Step S103, the processing proceeds to Step S105 (at a time point "b" in the time chart shown in FIG. 3). In Step S105, the temperature T of the DPF 4 is increased with the selected regenerating means in order to combust and to eliminate the particulate matters. The temperature increase of the DPF 4 is performed for a predetermined period enough to decrease the PM collection quantity M below the first threshold A1. For instance, the temperature increase of the DPF 4 is performed for a threshold T1. After that, the processing is ended once at a time point "c" in the time chart shown in FIG. 3.

When it is determined that the vehicle velocity V is not in the range VA in Step S103 and it is determined that the PM collection quantity M is equal to or greater than the second threshold A2 in Step S104, the processing also proceeds to Step S105, and the temperature T of the DPF 4 is increased with the selected regenerating means. For instance, after the time point "c" in the time chart shown in FIG. 3, the particulate matters deposit again, and the PM collection quantity M increases above the first threshold A1 at a time point "d" in FIG. 3. At that time, the vehicle velocity V is greater than the range VA. Therefore, the DPF 4 is not regenerated and the PM collection quantity M reaches the second threshold A2 at a time point "e" as shown in FIG. 3. In this case, if the PM collection quantity M increases further, the temperature of the DPF 4 may increase excessively during the regeneration. Therefore, the regeneration is performed immediately at the time point "e" regardless of the operating condition.

If it is determined that the calculated PM collection quantity M is equal to or greater than the first threshold A1 in Step S102 and it is determined that the vehicle velocity V is in the range VA in Step S103, for instance at a time point "f" in FIG. 3, the processing proceeds to Step S105. Then, the temperature T of the DPF 4 is increased to perform the regeneration.

As explained above, in the first embodiment, in the case in which the PM collection quantity M is equal to or greater than the first threshold A1 and is less than the second threshold A2, the regeneration of the DPF 4 is performed only when the operating state of the engine 1 is in the suitable area CA, which provides high temperature-increasing efficiency. As a result, the regeneration efficiency is improved. If the PM collection quantity M reaches the second threshold A2, the regeneration is performed even if the operating state is not in the suitable area CA. As a result, the safety is improved. Thus, the DPF 4 is regenerated safely and efficiently with relatively simple control, improving practicability.

The first and second thresholds A1, A2 of the PM collection quantity M, which are used as references for performing the temperature increase, can be set appropriately in consideration of the fuel consumption and the safety. For instance, the second threshold A2, at which the regeneration is performed regardless of the temperature-increasing efficiency for a safety reason, may be set first, and then, the first threshold A1 may be set at a value that accounts for about 80 percent of the second threshold A2.

In the first embodiment, the PM collection quantity M is calculated based on the pressure difference between the upstream portion and the downstream portion of the DPF 4. Alternatively, the state of the PM collection quantity M may be determined based on an integrated travel distance since the previous regeneration processing. More specifically, the state of the PM collection quantity M may be determined based on whether the integrated travel distance has reached a first or second threshold (D1, D2) or not. The second threshold D2 is greater than the first threshold D1. In this case, an effect similar to the first embodiment can be achieved by setting the first and second thresholds D1, D2 in accordance with the first and second thresholds A1, A2 respectively. Alternatively, the state of the PM collection quantity M may be determined based on an integrated fuel injection quantity Q since the previous regeneration processing. More specifically, the state of the PM collection quantity M may be determined based on whether the integrated fuel injection quantity Q has reached a first or second threshold (Q1, Q2) or not. The second threshold Q2 is greater than the first threshold Q1.

Second Embodiment

Figure 5:
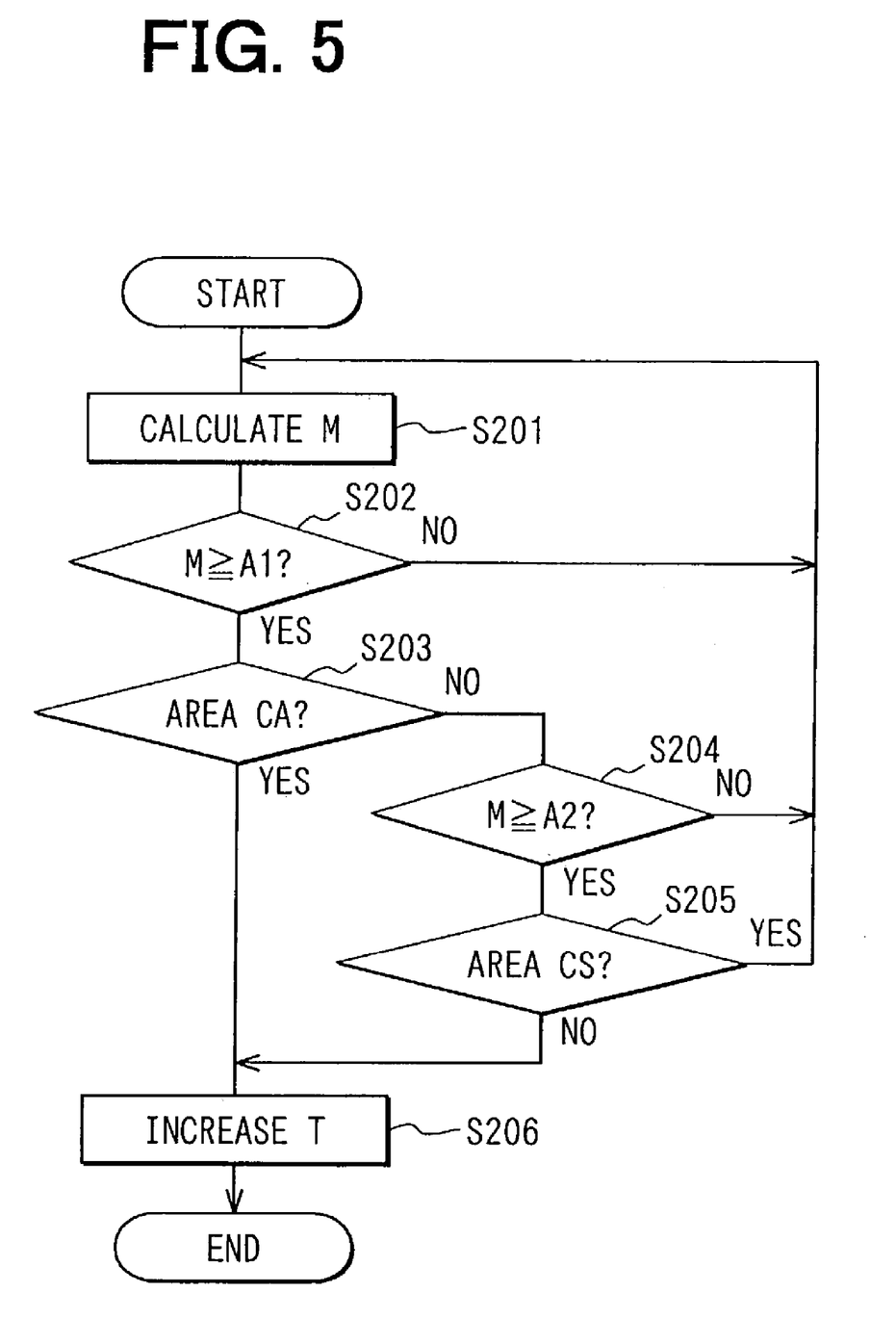
FIG. 5 is a flowchart showing regeneration processing performed by an ECU of an exhaust gas cleaning system according to a second embodiment of the present invention.

Next, regeneration control performed by an ECU 7 of a diesel engine 1 according to the second embodiment will be explained based on a flowchart shown in FIG. 5. In the second embodiment, the temperature increase of the DPF 4 is not performed when the operating state of the engine 1 is in a temperature increase dispensable area where the particulate matters can combust spontaneously even if the regenerating means is not operated. First, in Step S201, the ECU 7 calculates the PM collection quantity M based on the exhaust gas flow rate (volume flow rate) and the pressure difference between the upstream portion and the downstream portion of the DPF 4 like the first embodiment. Then, in Step S202, it is determined whether the calculated PM collection quantity M is "equal to or greater than" the first threshold A1 or not. If the result of the determination in Step S202 is "NO", the processing returns to the start.

If the result of the determination in Step S202 is "YES", the processing proceeds to Step S203. In Step S203, it is determined whether the engine 1 is in the suitable area CA, which is the area suitable for regenerating the DPF 4. If the result of the determination in Step S203 is "NO", the processing proceeds to Step S204. In Step S204, it is determined whether the PM collection quantity M is "equal to or greater than" the second threshold A2 or not. If the result of the determination in Step S204 is "NO", the processing returns to the start.

If the result of the determination in Step S203 is "YES", the processing proceeds to Step S206 and the temperature T of the DPF 4 is increased.

If the result of the determination in Step S204 is "YES", the processing proceeds to Step S205. In Step S205, it is determined whether the operating state of the engine 1 is in a temperature increase dispensable area CS where the particulate matters can combust spontaneously even if the regenerating means is not operated. If the result of the determination in Step S205 is "YES", the processing returns to the start.

For instance, when the engine is in an operating condition of an extremely heavy load, the exhaust gas temperature is usually high. Therefore, the particulate matters combust spontaneously even if the temperature-increasing control is not performed. Thus, the deterioration of the fuel consumption is inhibited more effectively by stopping the temperature-increasing control under such an operating condition.

Third Embodiment

Figure 6:
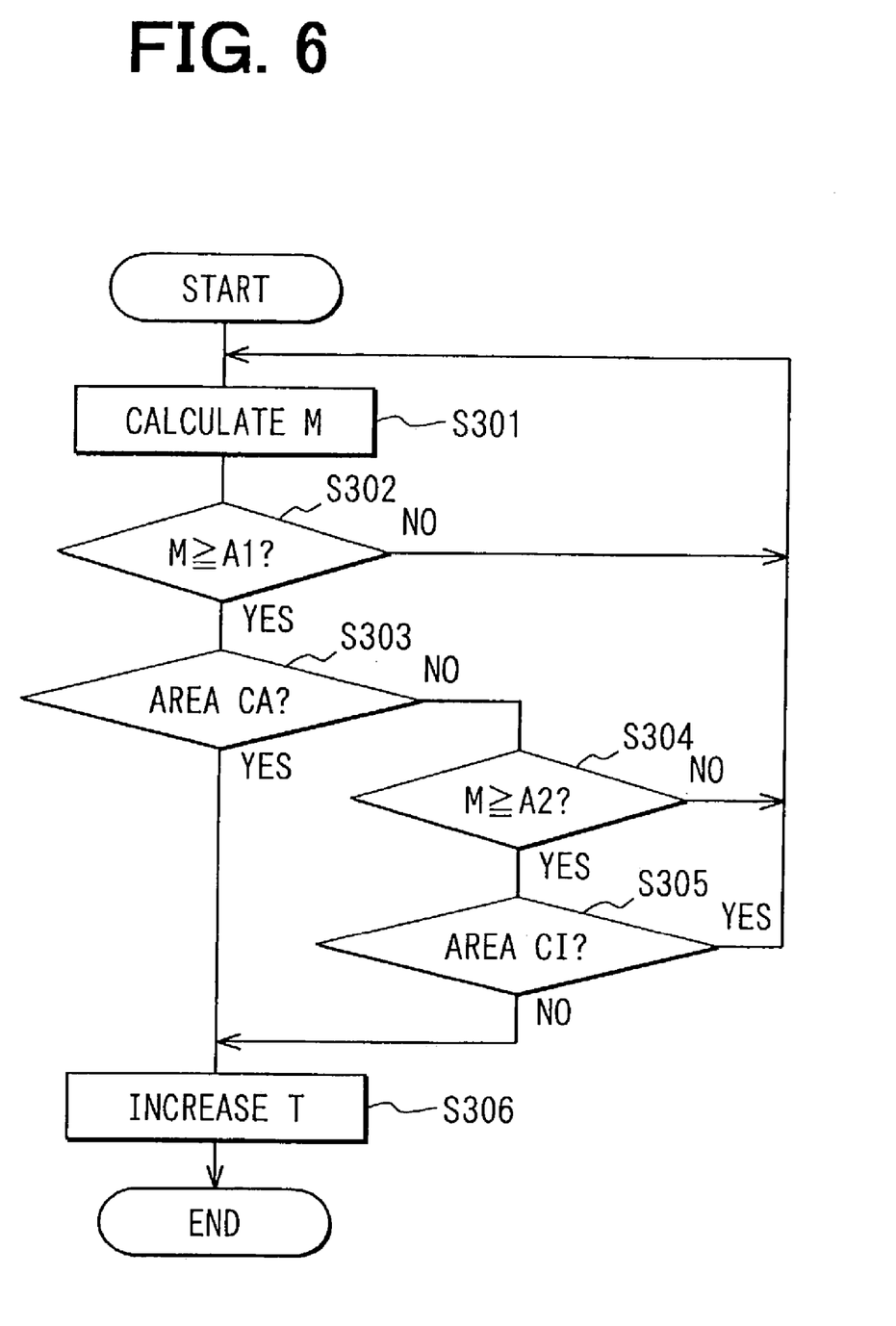
FIG. 6 is a flowchart showing regeneration processing performed by an ECU of an exhaust gas cleaning system according to a third embodiment of the present invention.

Next, regeneration control performed by an ECU 7 of a diesel engine 1 according to the third embodiment will be explained based on a flowchart shown in FIG. 6. In the third embodiment, the temperature increase of the DPF 4 is not performed when the operating state of the engine 1 is in a particulate matter combustion impossible area where the temperature increase of the DPF 4 is difficult. First, in Step S301, the ECU 7 calculates the PM collection quantity M based on the exhaust gas flow rate (volume flow rate) and the pressure difference between the upstream portion and the downstream portion of the DPF 4 like the first embodiment. Then, in Step S302, it is determined whether the calculated PM collection quantity M is "equal to or greater than" the first threshold A1 or not. If the result of the determination in Step S302 is "NO", the processing returns to the start.

If the result of the determination in Step S302 is "YES", the processing proceeds to Step S303. In Step S303, it is determined whether the operating state of the engine 1 is in the suitable area CA, which is the area suitable for regenerating the DPF 4. If the result of the determination in Step S303 is "NO", the processing proceeds to Step S304. In Step S304, it is determined whether the PM collection quantity M is "equal to or greater than" the second threshold A2 or not.

If the result of the determination in Step S304 is "NO", the processing returns to the start.

If it is determined that the operating state of the engine 1 is in the suitable area CA in Step S303, the processing proceeds to Step S306 and the temperature T of the DPF 4 is increased.

If it is determined that the PM collection quantity M is equal to or greater than the second threshold A2 in Step S304, the processing proceeds to Step S305. In Step S305, it is determined whether the operating state of the engine 1 is in a particulate matter combustion impossible area CI, in which the temperature T of the DPF 4 cannot be increased. If the result of the determination in Step S305 is "NO", the processing proceeds to Step S306, and the temperature T of the DPF 4 is increased. If the result of the determination in Step S305 is "YES", the processing returns to the start.

For instance, when the engine 1 is in an operating state such as an idling state in which the engine load is extremely low, it is difficult to increase the temperature of the exhaust gas to a temperature at which the particulate matters can be combusted. Therefore, in such a case, the temperature-increasing control is not performed. Instead, the regeneration is performed when the engine 1 is in a state in which the temperature-increase control is possible. Thus, the deterioration of the fuel consumption is inhibited.

Fourth Embodiment

Figure 7:
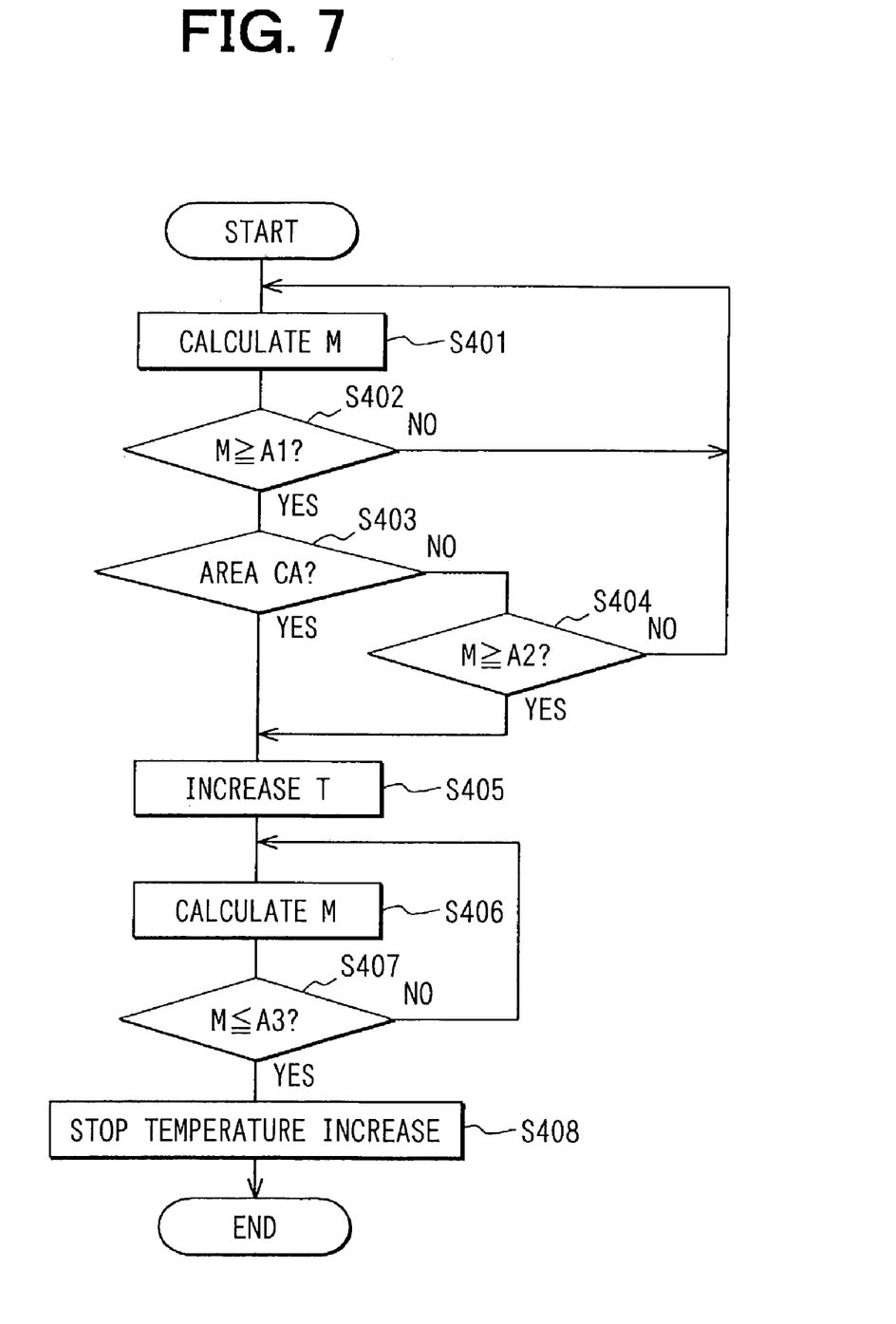
FIG. 7 is a flowchart showing regeneration processing performed by an ECU of an exhaust gas cleaning system according to a fourth embodiment of the present invention.

Next, regeneration control performed by an ECU 7 of a diesel engine 1 according to the fourth embodiment will be explained based on a flowchart shown in FIG. 7. In the fourth embodiment, ending timing of the temperature-increasing control is determined based on the calculated PM collection quantity. First, in Step S401, the ECU 7 calculates the PM collection quantity M based on the exhaust gas flow rate (volume flow rate) and the pressure difference between the upstream portion and the downstream portion of the DPF 4 like the first embodiment. Then, in Step S402, it is determined whether the calculated PM collection quantity M is "equal to or greater than" the first threshold A1 or not. If the result of the determination in Step S402 is "NO", the processing returns to the start.

If the result of the determination in Step S402 is "YES", the processing proceeds to Step S403. In Step S403, it is determined whether the engine 1 is in the suitable area CA, which is the area suitable for regenerating the DPF 4. If the result of the determination in Step S403 is "NO", the processing proceeds to Step S404. In Step S404, it is determined whether the PM collection quantity M is "equal to or greater than" the second threshold A2 or not. If the result of the determination in Step S404 is "NO", the processing returns to the start.

If it is determined that the operating state of the engine 1 is in the suitable area CA in Step S403 is or if it is determined that the PM collection quantity M is equal to or greater than the second threshold A2 in Step S404, the processing proceeds to Step S405. In Step S405, the temperature of the DPF 4 is increased by the selected regenerating means in order to combust and to eliminate the particulate matters. Then, in Step S406, the PM collection quantity M is calculated again. Then, in Step S407, it is determined whether the PM collection quantity M is "equal to or less than" a third threshold A3 or not. The third threshold A3 is less than the first threshold A1. If the result of the determination in Step S407 is "NO", the processing returns to Step S406. If the result of the determination in Step S407 is "YES", the processing proceeds to Step S408, and the temperature-increasing control is ended.

Thus, the ending timing of the temperature-increasing control is determined based on the calculated PM collection quantity M. Therefore, the regeneration control is performed more efficiently, inhibiting the deterioration of the fuel consumption. Alternatively, the temperature-increasing control may be ended when the operating state of the engine 1 enters the temperature increase dispensable area CS or the particulate matter combustion impossible area CI, during the regeneration.

MODIFICATION

In the above embodiments, the pressure difference sensor 6 is disposed for measuring the pressure difference between the upstream portion and the downstream portion of the DPF 4, and the PM collection quantity M is calculated based on the detected pressure difference. Alternatively, the PM collection quantity M may be calculated based on the pressure in the upstream portion of the DPF 4, which is measured by a pressure sensor disposed for measuring the pressure in the upstream portion of the DPF 4.

The present invention should not be limited to the disclosed embodiments, but may be implemented in many other ways without departing from the spirit of the invention.

What is claimed is:

1. An exhaust gas cleaning system of an internal combustion engine, the system comprising:
   a particulate filter disposed in an exhaust pipe of the engine for collecting particulate matters included in exhaust gas;
   operating state detecting means for detecting an operating state of the engine;
   regenerating means for regenerating the particulate filter; and
   regeneration controlling means for controlling the regeneration, the regeneration controlling means including collecting state determining means, regeneration suitability determining means and regeneration performing means, wherein;
   the collecting state determining means determines whether a collecting state parameter, which increases as a quantity of the collected particulate matters increases, is equal to or greater than a first threshold or a second threshold, which is greater than the first threshold,
   the regeneration suitability determining means determines whether the detected operating state is in a suitable area for the regeneration, in which high regenerating efficiency of the particulate filter is provided, the regeneration suitability determining means determining that the detected operating state is in the suitable area when an air intake amount is less than a predetermined value and temperature of the particulate filter is higher than a certain value, and
   the regeneration performing means performs the regeneration of the particulate filter with the regenerating means only when the detected operating state is in the suitable area in the case in which the collecting state parameter is equal to or greater than the first threshold and is less than the second threshold, and performs the regeneration when the collecting state parameter is equal to or greater than the second threshold regardless of the result of the determination performed by the regeneration suitability determining means.

2. An exhaust gas cleaning system of an internal combustion engine, the system comprising:
   a particulate filter disposed in an exhaust pipe of the engine for collecting particulate matters included in exhaust gas;
   operating state detecting means for detecting an operating state of the engine;
   regenerating means for regenerating the particulate filter; and
   regeneration controlling means for controlling the regeneration, the regeneration controlling means including collecting state determining means, regeneration suitability determining means and regeneration performing means; wherein:
   the collecting state determining means determines whether a collecting state parameter, which increases as a quantity of the collected particulate matters increases, is equal to or greater than a first threshold or a second threshold, which is greater than the first threshold;
   the regeneration suitability determining means determines whether the detected operating state is in a suitable area for the regeneration, in which high regenerating efficiency of the particulate filter is provided;
   the regeneration performing means performs the regeneration of the particulate filter with the regenerating means only when the detected operating state is in the suitable area in the case in which the collecting state parameter is equal to or greater than the first threshold and is less than the second threshold, and performs the regeneration when the collecting state parameter is equal to or greater than the second threshold regardless of the result of the determination performed by the regeneration suitability determining means; and
   the regeneration performing means is prohibited from regenerating the particulate filter when the detected operating state is in a temperature increase dispensable area in which the collected particulate matters combust spontaneously or when the detected operating state is in a particulate matter combustion impossible area in which temperature-increase control is impossible, even if the collecting state parameter is equal to or greater than the first or second threshold.

3. The exhaust gas cleaning system as in claim 2, wherein;
   the operating state detecting means detects at least one from the group consisting of rotation speed of the engine, a fuel injection quantity, vehicle velocity, a flow rate of intake air and temperature of the particulate filter, and
   the regeneration suitability determining means determines whether the operating state is in the suitable area or not based on detection values provided by the operating state detecting means.

4. The exhaust gas cleaning system as in claim 2, further comprising:
   particulate collection quantity calculating means for calculating a quantity of the collected particulate matters as the collecting state parameter.

5. The exhaust gas cleaning system as in claim 2, further comprising:
   integrated travel distance calculating means for calculating an integrated travel distance since the previous regeneration as the collecting state parameter.

6. The exhaust gas cleaning system as in claim 2, further comprising:
   integrated fuel injection quantity calculating means for calculating an integrated fuel injection quantity since the previous regeneration as the collecting state parameter.

7. The exhaust gas cleaning system as in claim 2, wherein;
   the regeneration performing means ends the regeneration when the collecting state determining means determines that the collecting state parameter is equal to or less than a third threshold after the regeneration is started, the third threshold being less than the first threshold.

8. The exhaust gas cleaning system as in claim 2, wherein;
   the regeneration performing means ends the regeneration when a regenerating period becomes equal to or longer than a threshold period after the regeneration is started.

9. An exhaust gas cleaning system of an internal combustion engine, the system comprising:
   a particulate filter disposed in an exhaust pipe of the engine for collecting particulate matters included in exhaust gas;
   operating state detecting means for detecting an operating state of the engine;
   regenerating means for regenerating the particulate filter; and
   regeneration controlling means for controlling the regeneration, the regeneration controlling means including collecting state determining means, regeneration suitability determining means and regeneration performing means; wherein:
   the collecting state determining means determines whether a collecting state parameter, which increases as a quantity of the collected particulate matters increases, is equal to or greater than a first threshold or a second threshold, which is greater than the first threshold,
   the regeneration suitability determining means determines whether the detected operating state is in a suitable area for the regeneration, in which high regenerating efficiency of the particulate filter is provided;
   the regeneration performing means performs the regeneration of the particulate filter with the regenerating means only when the detected operating state is in the suitable area in the case in which the collecting state parameter is equal to or greater than the first threshold and is less than the second threshold, and performs the regeneration when the collecting state parameter is equal to or greater than the second threshold regardless of the result of the determination performed by the regeneration suitability determining means; and
   the regeneration performing means ends the regeneration when the detected operating state enters a temperature increase dispensable area in which temperature of the particulate filter enabling the particulate matters to combust spontaneously even if the regenerating means is not operated is obtained or when the detected operating state enters a particulate matter combustion impossible area in which the temperature-increase control is impossible, after the regeneration is started.

10. A method of cleaning exhaust gas of an internal combustion engine, the method comprising:
    disposing a particulate filter in an exhaust pipe of the engine for collecting particulate matters included in exhaust gas;
    detecting an operating state of the engine;
    determining whether a collecting state parameter, which increases as a quantity of the collected particulate matters increases, is equal to or greater than a first threshold or a second threshold, which is greater than the first threshold;

determining whether the detected operating state is in a suitable area for regeneration of the particulate filter, in which high regenerating efficiency of the particulate filter is provided the operating state being determined to be in the suitable area when air intake amount is less than a predetermined value and temperature of the particulate filter is higher than a certain value; and performing the regeneration of the particulate filter only when the detected operating state is in the suitable area in which high regenerating efficiency of the particulate filter is provided and when the collecting state parameter is equal to or greater than the first threshold and is less than the second threshold, and performing the regeneration when the collecting state parameter is equal to or greater than the second threshold regardless of the determination of whether the detected operating state is in the suitable area for regeneration in which high regenerating efficiency of the particulate filter is provided.

11. A method of cleaning exhaust gas of an internal combustion engine, the method comprising:

disposing a particulate filter in an exhaust pipe of the engine for collecting particulate matters included in exhaust gas;

detecting an operating state of the engine;

determining whether a collecting state parameter, which increases as a quantity of the collected particulate matters increases, is equal to or greater than a first threshold or a second threshold, which is greater than the first threshold;

determining whether the detected operating state is in a suitable area for regeneration of the particulate filter, in which high regenerating efficiency of the particulate filter is provided;

performing the regeneration of the particulate filter only when the detected operating state is in the suitable area in which high regenerating efficiency of the particulate filter is provided and when the collecting state parameter is equal to or greater than the first threshold and is less than the second threshold, wherein regenerating the particulate filter is prohibited when the detected operating state is in a temperature increase dispensable area in which the collected particulate matters combust spontaneously or when the detected operating state is in a particulate matter combustion impossible area in which temperature-increase control is impossible, even if the collecting state parameter is equal to or greater than the first or second threshold; and performing the regeneration when the collecting state parameter is equal to or greater than the second threshold regardless of the determination of whether the detected operating state is in the suitable area for regeneration in which high regenerating efficiency of the particulate filter is provided.

12. The method as in claim 11, wherein:

detecting the operating state comprises detecting at least one from the group consisting of rotation speed of the engine, a fuel injection quantity, vehicle velocity, a flow rate of intake air and temperature of the particulate filter; and determining whether the operating state is in the suitable area or not is based on detection values provided by detection of said at least one from the group.

13. The method as in claim 11, further comprising:

calculating a quantity of the collected particulate matters as the collecting state parameter.

14. The method as in claim 11, further comprising:

calculating an integrated travel distance since a previous regeneration as the collecting state parameter.

15. The method as in claim 11, further comprising:

calculating an integrated fuel injection quantity since a previous regeneration as the collecting state parameter.

16. The method as in claim 11, wherein regenerating the particulate filter is ended when the collecting state parameter is determined to be equal to or less than a third threshold after the regeneration is started, the third threshold being less than the first threshold.

17. The method as in claim 11, wherein regenerating the particulate filter is ended when a regenerating period becomes equal to or longer than a threshold period after the regeneration is started.

18. A method of cleaning exhaust gas of an internal combustion engine, the method comprising:

disposing a particulate filter in an exhaust pipe of the engine for collecting particulate matters included in exhaust gas;

detecting an operating state of the engine;

determining whether a collecting state parameter, which increases as a quantity of the collected particulate matters increases, is equal to or greater than a first threshold or a second threshold, which is greater than the first threshold;

determining whether the detected operating state is in a suitable area for regeneration of the particulate filter, in which high regenerating efficiency of the particulate filter is provided;

performing the regeneration of the particulate filter only when the detected operating state is in the suitable area in which high regenerating efficiency of the particulate filter is provided and when the collecting state parameter is equal to or greater than the first threshold and is less than the second threshold, wherein the regeneration is ended when the detected operating state enters a temperature increase dispensable area in which temperature of the particulate filter enabling the particulate matters to combust spontaneously even if the regeneration is not performed is obtained or when the detected operating state enters a particulate matter combustion impossible area in which the temperature-increase control is impossible, after the regeneration is started; and performing the regeneration when the collecting state parameter is equal to or greater than the second threshold regardless of the determination of whether the detected operating state is in the suitable area for regeneration in which high regenerating efficiency of the particulate filter is provided.

* * * * *